Jan. 27, 1931.  F. O. HOAGLAND  1,790,543
RELIEVING MECHANISM FOR LATHES
Filed April 11, 1928   2 Sheets-Sheet 1
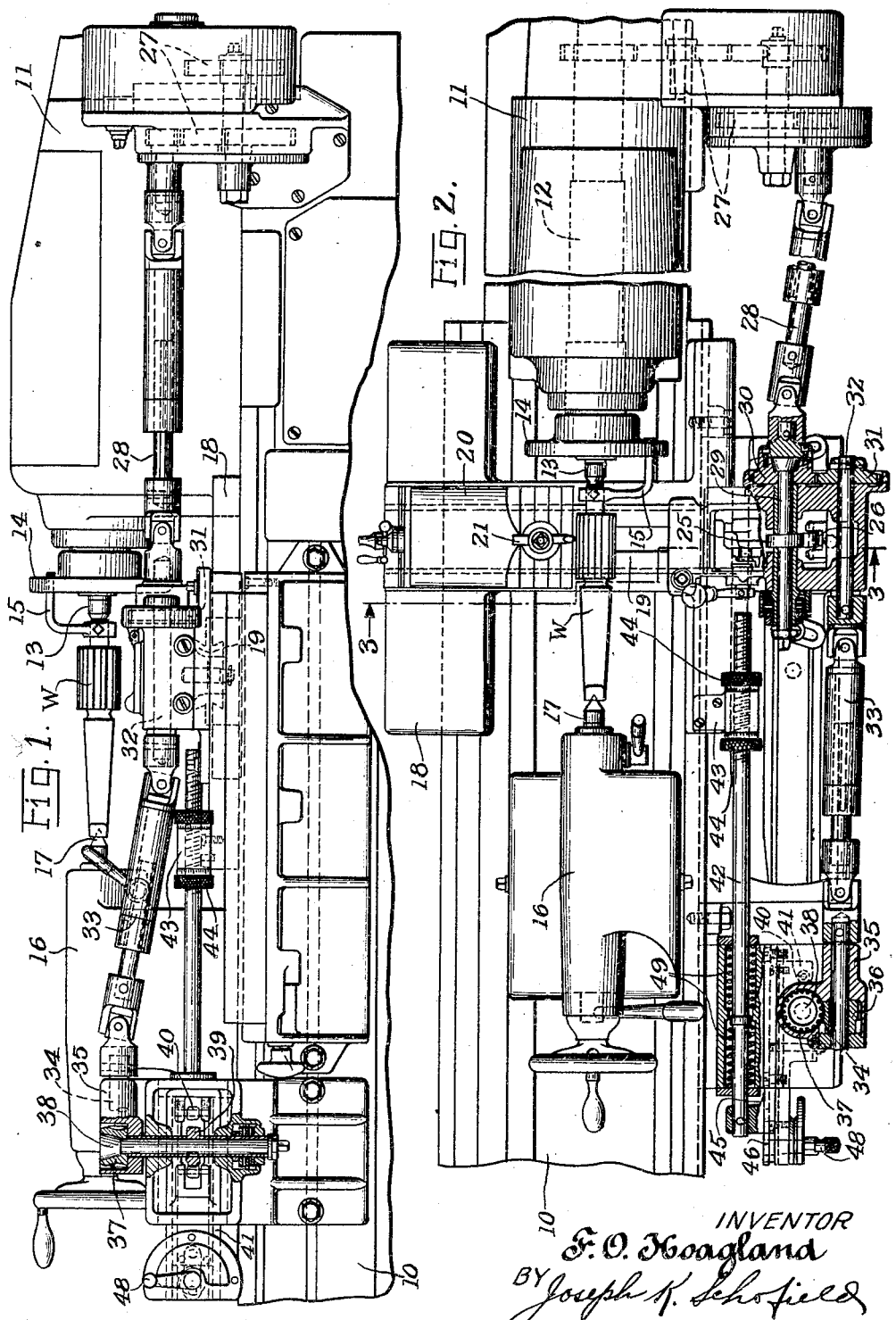
INVENTOR
F. O. Hoagland
BY Joseph K. Schofield
ATTORNEY

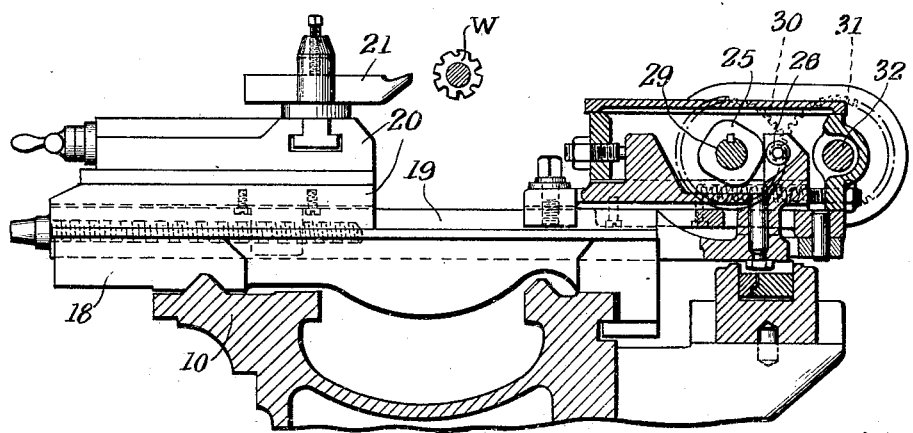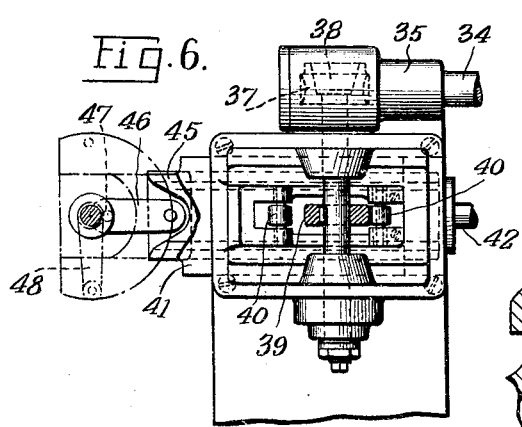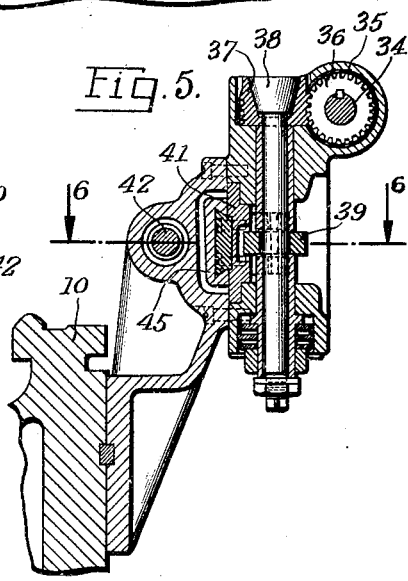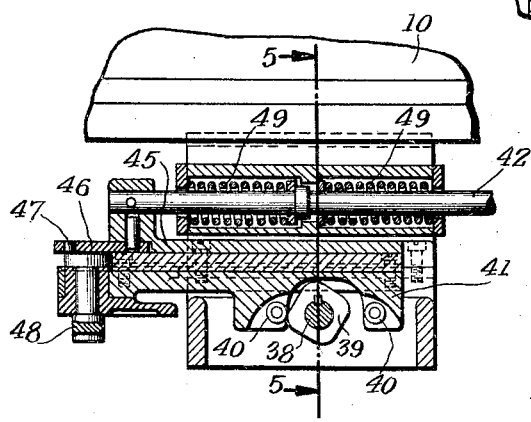

Patented Jan. 27, 1931

1,790,543

UNITED STATES PATENT OFFICE

FRANK O. HOAGLAND, OF HARTFORD, CONNECTICUT, ASSIGNOR TO PRATT & WHITNEY COMPANY, OF NEW YORK, N. Y., A CORPORATION OF NEW JERSEY

RELIEVING MECHANISM FOR LATHES

Application filed April 11, 1928. Serial No. 269,048.

This invention relates to lathes and in particular to a relieving mechanism therefor adapted to permit relieving movements of a tool in any direction relative to the work being operated on.

An object of the present invention is to provide relieving mechanism for a lathe adapting a lathe tool on the cross slide of an axially movable lathe carriage to effect relieving movements of the tool either radially directly toward and from the axis of rotation of the lathe spindle, in a direction parallel thereto, or in any oblique direction relative thereto.

One feature which enables me to accomplish the above named object is that two relieving cams are mounted for rotation in the lathe, each being rotatable from and in timed relation to the rotation of the lathe spindle. One of these cams is adapted to move the lathe carriage in a direction parallel to the axis of the lathe spindle and the other cam is adapted to effect movements of the cross slide on the lathe carriage in a direction normal to the axis of the lathe spindle.

Another object of the invention is to provide means to simultaneously effect axial movements of the lathe carriage and movements of the cross slide normal to the lathe spindle so that oblique movements of a tool on the cross slide may be effected while the work is being rotated.

With these and other objects in view my invention consists in the features of construction and operation set forth in the following specification and illustrated in the accompanying drawings.

In the accompanying drawings annexed hereto and forming a part of this specification, I have shown my invention embodied in a tool maker's lathe, but it will be understood that the invention can be otherwise embodied and that the drawings are not to be construed as defining or limiting the scope of the invention, the claims appended to this specification being relied upon for that purpose.

In the drawings:

Figure 1 is a rear elevation of a lathe provided with the present invention.

Fig. 2 is a plan view of a complete lathe provided with the present invention, parts being broken away to more clearly show their construction.

Fig. 3 is a side elevation in section of the lathe taken upon the line 3—3 of Fig. 2.

Fig. 4 is a horizontal sectional view of a portion of the mechanism shown in Fig. 2.

Fig. 5 is a transverse sectional view taken upon the line 5—5 of Fig. 4, and

Fig. 6 is a sectional view of the parts shown in Fig. 5 taken upon line 6—6 thereof.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a base; second, a headstock mounted at one end thereof; third, a work supporting and rotating spindle rotatably mounted in said headstock; fourth, a carriage slidable on the base in a direction parallel to the axis of rotation of the spindle; fifth, a tool slide on said carriage slidably movable at right angles to the movement of the carriage in a direction directly toward and from the axis of rotation of the spindle; sixth, a cam mounted upon the carriage and in the rear of the tool slide adapted to contact with and actuate the slide; seventh, driving means for rotating this cam directly from the lathe spindle; eighth, a second cam mounted for rotation upon a fixed axis relative to the base and adapted to contact with and actuate a slide mounted for horizontal movement in a direction parallel to the lathe spindle; ninth, means connecting this member to the lathe carriage so that reciprocatory movements of the member will induce corresponding movements of the tool carriage; and tenth, driving means for rotating the second cam preferably connected directly to the driving means for the first cam so that the two cams may be simultaneously rotated at the same speed.

Referring more in detail to the figures of the drawings, I provide a base 10 having mounted thereon a headstock 11 within which is mounted for rotation a spindle 12. Work W may be mounted on the center 13 provided at one end of this spindle 12 and rotated by means of the face plate 14 and driver 15. Also on the base 10 is a tailstock 16 having an adjustable tailstock center 17 therein also serving to support the work W in position for rotation. Slidable horizontally along the base 10 on guideways provided therefor is a carriage 18. This carriage 18, as is usual in lathes, moves in a direction exactly parallel to the axis of rotation of the work spindle 12. Mounted on this carriage 18 is a tool supporting slide 19 slidable in a direction at right angles to the direction of movement of the carriage 18 directly toward and from the axis of rotation of the spindle 12 and work W. These parts, as above described, are, or may be, similar in every way to those usually found in lathes of medium size. It is not thought necessary, therefore, to describe the construction of the carriage 18 and slide 19 more in detail. It will be understood, of course, that on the transversely movable slide 19 is a compound tool slide or rest 20 by means of which a tool 21 may be adjusted toward and from the axis of rotation of the spindle 12.

In order to effect relieving movements of the cross slide 19 on the carriage 18, means may be provided in every way similar to those disclosed in the patent to Lindstrom 1,516,196 granted November 18, 1925. By these means a relieving cam 25, shown in Fig. 3 as having four lobes, contacts with a roller 26 carried by the slide 18 at its rear end and actuates this slide 18 transversely of the base 10 while the cam 25 is being constantly rotated. In order to rotate the cam 25, driving connections 27 are provided for a telescoping shaft 28 shown clearly in Figs. 1 and 2. These driving connections 27 are connected to the headstock spindle 12 and as shown in Fig. 2 comprise change gears. One end of this telescoping shaft 28 is attached to a shaft 29 mounted in rear of the carriage 18 on which is mounted the cam 25. The relieving cam 25, therefore, will be rotated in timed relation to the rotation of the work supporting and rotating spindle 12 at any predetermined relation. By engagement of the roller 26 with the cam 25 the tool 21 will be advanced toward and from the axis of the spindle 12 a plurality of times during each rotation of the spindle. By varying the ratio of gearing in the driving connections 27 or the number of lobes on the cam 25 the number of reciprocatory movements of the tool 21 may be widely varied for each rotation of the work W. As the cam 25 and its driving means and the actuating means for the slide 18 operated thereby may be identical with the mechanism shown and described in the above mentioned patent, further description thereof is thought to be unnecessary.

Mounted on the shaft 29 carrying the cam above described is a gear 30 preferably frictionally driven thereby. This gear 30 is in mesh with a gear 31 of similar tooth number on a shaft 32 parallel to the cam shaft 29. This shaft 32, at its opposite end, is connected to one member of the telescoping shaft 33, the opposite member of which is attached to a short horizontal shaft 34 rotatably mounted within a bracket 35 adapted to be bolted to the rear face of the lathe base 10. By means of spiral gears 36 and 37 this shaft 34 rotates a vertical shaft 38 mounted within the bracket 35 on which is provided a relieving cam 39. The driving connections for this shaft 38 are such that its cam 39 will rotate at exactly the same speed as the first cam 25. Adapted to be actuated by the cam 39 and to contact directly therewith is one of a pair of rollers 40 on a horizontally slidable member 41 also mounted in the bracket 34. Movement of this slide 41 horizontally will correspond exactly with the rotations of the cam 39. Attached to this slide 41, in a manner presently to be described, is a rod 42, the opposite end of which is threaded and adapted to pass through a projection 43 or bracket formed on the lathe carriage 18. Nuts 44 engaging this threaded portion of rod 42 are adapted to engage opposite faces of the projection 43 on the lathe carriage 18. It will be seen from the above, therefore, that rotation of the second cam 39 will reciprocate the lathe carriage 18, these movements of the carriage 18 being in timed relation to the rotation of the cam 25 and the transverse movements of the cross slide 19.

Referring to Figs. 4 and 5 it will be seen that rod 42 is attached to a slide 45 movable relatively to the slide 41 on which the roller 40 engaging the cam 39 is mounted. These two slides 41 and 45 are connected by means of a link 46, one end of which is pivoted to the slide 45 and the other end pivotally engages an eccentric pin 47 in a stud 48 mounted in the slide 41. By rotating the stud 48 as by means of the handle 48 the relative positions of the slides 41 and 45 may be changed.

In one position of the slides 41 and 45 the roller 40 upon one side of the cam 39 contacts therewith and in the other position of the slides the opposite roller 40 contacts with the cam 39. Springs 49 are provided suitably housed within the bracket 35, one of which is adapted to be compressed upon movement of the slide 45 in one direction. By means of these springs 49 the slide 45 is returned to its normal position after being forced in one direction by the cam 39 and one of the rollers 40. By moving the handle 48 to an intermediate position neither of the rollers 40 will engage the cam 39. Rotation of the cam 39 in that instance will not effect the movement of the rod 42 but the slide 18 will remain immovable.

What I claim is:

1. A relieving mechanism for lathes comprising in combination, a base, a headstock, a work supporting and rotating spindle therein, a carriage movable along said base, a tool slide movable on said carriage in a direction normal to the axis of said spindle, a spiral cam for actuating the carriage, a spiral cam for actuating the slide, means driven from said spindle for simultaneously rotating said cams at the same speed, and means to render one or both of said cams inoperative whereby either cam may be used singly or both cams may be used in combination.

2. A relieving mechanism for lathes comprising in combination, a base, a headstock, a work supporting and rotating spindle therein, a carriage movable along said base, a tool slide movable on said carriage in a direction normal to the axis of said spindle, a cam rotatably mounted on said base for actuating the carriage, a cam rotatably mounted on said carriage for actuating the slide, connections between said cams and said carriage and slide respectively for imparting relieving movements in either of opposite directions, and means driven from said spindle for simultaneously rotating said cams in timed relation to the rotation of said spindle.

3. A relieving mechanism for lathes comprising in combination, a base, a headstock, a work supporting and rotating spindle therein, a carriage movable along said base, a tool slide movable on said carriage in a direction normal to the axis of said spindle, spiral cam means driven from the spindle to reciprocate the carriage axially of said spindle in timed relation to the rotation thereof, means simultaneously acting to reciprocate said slide in a direction normal to the axis of the spindle in timed relation to the rotation thereof, and means to reverse the reciprocatory action of the carriage from its cam relative to the reciprocations of the slide.

4. A relieving mechanism for lathes comprising in combination, a base, a headstock, a work supporting and rotating spindle therein, a carriage movable along said base, a tool slide movable on said carriage in a direction normal to the axis of said spindle, a spiral cam driven from said spindle and adapted to actuate said slide toward and from the axis of said spindle in timed relation to the rotation thereof, a second spiral cam driven from said spindle and adapted to actuate said carriage axially of said spindle and in timed relation thereto, and connections between said cams and said carriage and slide respectively for imparting movements in either of opposite directions.

5. A relieving mechanism for lathes comprising in combination, a base, a headstock, a work supporting and rotating spindle therein, a carriage movable along said base, a tool slide movable on said carriage in a direction normal to the axis of said spindle, a cam driven from said spindle and adapted to actuate said slide toward and from the axis of said spindle in timed relation to the rotation thereof, a second cam driven from said spindle and adapted to actuate said carriage axially of said spindle and in timed relation thereto, and connections between said cams and said carriage and slide respectively for imparting relieving movements in either of opposite directions.

In testimony whereof, I hereto affix my signature.

FRANK O. HOAGLAND.